US011559067B2

(12) United States Patent
Higiro et al.

(10) Patent No.: US 11,559,067 B2
(45) Date of Patent: Jan. 24, 2023

(54) TASTE IMPROVEMENT USING MIRACLE FRUIT FOR JUICE FROM DISEASE IMPACTED FRUIT

(71) Applicant: The Coca-Cola Company, Atlanta, GA (US)

(72) Inventors: Juvenal Higiro, Atlanta, GA (US); Xiaoliang Tan, Atlanta, GA (US); You Chen, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/461,322

(22) PCT Filed: Nov. 15, 2017

(86) PCT No.: PCT/US2017/061790
§ 371 (c)(1),
(2) Date: May 15, 2019

(87) PCT Pub. No.: WO2018/093893
PCT Pub. Date: May 24, 2018

(65) Prior Publication Data
US 2020/0054044 A1    Feb. 20, 2020

Related U.S. Application Data

(60) Provisional application No. 62/423,163, filed on Nov. 16, 2016.

(51) Int. Cl.
*A23L 2/06* (2006.01)
*A23L 33/105* (2016.01)
*A23L 27/12* (2016.01)
*A23L 2/56* (2006.01)

(52) U.S. Cl.
CPC .......... *A23L 2/06* (2013.01); *A23L 2/56* (2013.01); *A23L 27/12* (2016.08); *A23L 33/105* (2016.08)

(58) Field of Classification Search
CPC .......... A23L 2/06; A23L 33/105; A23L 27/12; A23L 2/56
USPC ......................................... 426/599, 616, 519
See application file for complete search history.

(56) References Cited

U.S. PATENT DOCUMENTS

| 3,165,415 A | 1/1965 | Kilburn et al. |
| 3,849,555 A | 11/1974 | Harvey |
| 3,920,815 A * | 11/1975 | Harvey |
| 2011/0144218 A1 | 6/2011 | Posner et al. |
| 2013/0130972 A1* | 5/2013 | Le Coutre |
| 2013/0171316 A1 | 7/2013 | Galindo Cuspinera et al. |
| 2014/0348992 A1 | 11/2014 | Shea et al. |

FOREIGN PATENT DOCUMENTS

| CN | 103932333 A | 7/2014 |
| CN | 105942056 A | 9/2016 |

OTHER PUBLICATIONS

Del Oro , 2020, "Concentrated Orange Juice", pp. 1-3, http://www.delorocr.com/products/concentrat-orange. (Year: 2020).*
Del Oro, 2020, "Single strength orange juice", pp. 1-3, http://delorocr.com/products/single-strength-orange. (Year: 2020).*
International Search Report and Written Opinion corresponding to PCT/US2017/061790, dated Jan. 29, 2018, 10 pages.
Supplementary European Search Report from EP 17872710 dated Jul. 29, 2020.
Anonymous, "Bioresources International: Miraculin Data Sheet", Jan. 1, 2005, XP055684245, Re-trieved from the Internet: URL:http://miraculin.com/miraculin_sheet.htm.
Rodrigues Jessica Ferreira et al: "Miracle fruit: An alternative sugar substitute in sour bev-erages", Appetite, Academic Press, New York, NY, US, vol. 107, Sep. 13, 2016, pp. 645-653.
Sardesai V M et al: "Natural and synthetic intense sweeteners", The Journal of Nutritional Biochemistry, Elsevier, Amsterdam, NL, vol. 2, No. 5, May 1, 1991 (May 1, 1991), pp. 236-244.
Giroux: "Purification and Some Properties of Miraculin", Journal of Agricultural and Food Chemistry, vol. 22, No. 4, Jan. 1, 1974 (Jan. 1, 1974), pp. 595-601.
Chika C. Nwugo et al: Study on Citrus Response to Huanglongbing Highlights a Down-Regulation of Defense-Related Proteins in Lemon Plants Upon 'Ca. Liberibacter asiaticus' Infection , Plos One, vol. 8, No. 6, Jun. 19, 2013.
Janine M Wong et al: "Miracle fruit improves sweetness of a low-calorie dessert without promot-ing subsequent energy compensation", Appetite, Academic Press, New York, NY, vol. 56, No. 1, Oct. 8, 2010 (Oct. 8, 2010), pp. 163-166.

* cited by examiner

*Primary Examiner* — Helen F Heggestad
(74) *Attorney, Agent, or Firm* — King & Spalding

(57) ABSTRACT

Provided are compositions with a citrus juice having a brix-to-acid ratio of less than about 16:1, and a miracle fruit component, as well as processes for making such compositions.

23 Claims, No Drawings

TASTE IMPROVEMENT USING MIRACLE FRUIT FOR JUICE FROM DISEASE IMPACTED FRUIT

REFERENCE TO RELATED APPLICATION

This application is a 371 National Phase Application that claims the benefit of International Patent Application No. PCT/US2017/061790, filed Nov. 15, 2017, which claims the benefit of U.S. provisional application No. 62/423,163, filed Nov. 16, 2016, the contents of which are herein incorporated by reference in their entirety.

FIELD OF THE INVENTION

The principles of the present invention relate generally to improving the taste of citrus juice made from fruit impacted by disease, such as citrus greening disease, using miracle fruit.

BACKGROUND OF THE INVENTION

Citrus greening disease, also called huánglóngbìng or HLB, has a negative impact on the citrus industry globally. As of the time of filing this application, there is no known cure for citrus greening disease. Citrus greening disease is known to infect orange, lemon, lime, grapefruit, kumquat, and tangerine trees. Citrus greening disease infects citrus trees around the world. In recent years, the concern for citrus greening disease has been increasing in the United States as the number of infected trees has increased. Citrus juice accounts for over half of the juice consumed in the United States with literally billions of gallons of citrus juice consumed in the United States annually.

Trees impacted by citrus greening disease exhibit yellowing of the veins and adjacent tissues in their leaves, which is followed by splotchy mottling of the entire leaf. These trees also exhibit premature defoliation and dieback of twigs. The citrus greening disease also causes decay of feeder rootlets and lateral roots, and decline in overall vigor of the plant. Eventually, the entire plant dies. Trees with citrus greening disease have stunted growth and bear multiple off-season flowers. These trees also typically produce small, irregularly-shaped fruit with a thick, pale peel. The peel often remains green at the bottom and tastes very bitter. These fruits also usually produce juice that is too bitter and too sour for a typical human consumer to find acceptable, and thus these fruits are generally deemed of little value by the citrus juice industry.

A potential solution for juice makers is to add flavor modulators to citrus juice from fruits impacted by disease, including citrus greening disease. Flavor modulators include bitterness blockers. However, most bitterness blockers include, or are made of, compounds that are not natural and may need to be disclosed on product labeling, which often discourage sales given that many consumers prefer all natural products, and thus most bitterness blockers would be unacceptable to those consumers.

Miracle fruit or miracle berry is a plant, *Synsepalum dulcificum*, found in West Africa. The pulp of the miracle fruit contains a protein known as "miraculin," which has the ability to bind to taste receptors on the human tongue, which causes humans to perceive sour or bitter foods as tasting sweet. Miracle fruit tablets are commercially available as supplements in some regions. Such miracle fruit tablets are chewed by consumers before consuming sour or bitter beverages or foods. The consumer then experiences those sour beverages or foods as tasting sweet. However, when consuming the tablets, changes in sweet perception by a consumer is delayed in onset, and consumers often experience perceiving everything as tasting sweet for several hours after consuming the tablets.

In order for the citrus juice industry to make better use (or any use at all) of citrus fruit impacted by disease, including citrus greening disease, there is a need for a natural modulator that will reduce or eliminate the bitterness and sourness of the juice obtained from citrus impacted by disease without negatively impacting the flavor profile of the juice and without adding artificial components that are often rejected by consumers.

BRIEF SUMMARY OF THE INVENTION

The present disclosure addresses the issue of making consumer acceptable citrus juice from citrus fruits grown on trees affected by disease, including citrus greening disease, by adding a miracle fruit component to the citrus juice. Unexpectedly, it was found that when combined with citrus fruit juice in certain ratios, miracle fruit component could change the perceived taste without latent onset.

One aspect of the present disclosure is the provision of compositions including a citrus juice with a brix-to-acid ratio of less than about 16:1 and a miracle fruit component.

Another aspect of the present disclosure is the provision of compositions including a citrus juice obtained from citrus fruits grown on a plant infected with disease and a miracle fruit component. In certain embodiments, the disease is citrus greening disease.

In certain embodiments, the citrus juice is selected from orange juice, grapefruit juice, lemon juice, lime juice, kumquat juice, tangerine juice, and combinations thereof. Other citrus juice is also contemplated. In other embodiments, the citrus juice is in concentrated form. In further embodiments, the citrus juice is fresh citrus juice.

In yet further embodiments, the miracle fruit component is obtained from miracle fruit pulp powder, fresh miracle fruit pulp, frozen miracle fruit pulp, concentrated miracle fruit pulp, or synthetic sources.

A person of ordinary skill in the art would understand that the concentrations of the miracle fruit component can vary depending on the addition, substitution, and/or subtraction of ingredients in a given composition, as well as the perceived bitterness and sourness of the starting citrus juice.

Another aspect of the present disclosure is the provision of a process of making a citrus juice by mixing a citrus juice having a brix-to-acid ratio of less than about 16:1 with a miracle fruit component to produce a miracle fruit citrus juice composition. In further embodiments, the process includes making a citrus juice from citrus fruit obtained from trees infected with disease, including citrus greening disease. The process may include mixing citrus juice from citrus fruits grown on trees infected with disease with a miracle fruit component to produce a miracle fruit citrus juice composition.

In further embodiments, the process may include use of citrus juice that is concentrated citrus juice. In some embodiments, the process further includes diluting the concentrated citrus juice with water before mixing the citrus juice and miracle fruit juice. In other embodiments, the process further includes diluting the miracle fruit citrus juice composition after mixing the citrus juice with miracle fruit juice. In further embodiments, the process includes determining a brix-to-acid ratio of the citrus juice to then determine the amount of miracle fruit component to add to the citrus juice to achieve a final product to be deemed acceptable to a consumer.

In certain embodiments, the process may include the use of miracle fruit component that is powdered miracle fruit pulp. In such embodiments, the process may in some instances further include dissolving the miracle fruit component in water or other liquid before the mixing with citrus juice.

Another aspect of the present disclosure may include making a citrus juice from citrus fruit obtained from trees infected with disease, such as citrus greening disease. The process includes providing concentrated citrus juice from citrus fruits grown on trees infected with disease, such as citrus greening disease. The concentrated citrus juice may then be diluted with water to produce a diluted citrus juice. The process may further include providing powdered miracle fruit component from miracle fruit pulp. The powdered miracle fruit component may be dissolved in water or other liquid to produce a liquid miracle fruit component. In some embodiments, particulates or solids may be removed using known methods, such as centrifuging, from the liquid miracle fruit component before being added to a beverage. The liquid miracle fruit component may then be mixed with the citrus juice to produce a miracle fruit citrus juice composition.

In some embodiments, these processes include citrus juice that is selected from orange juice, grapefruit juice, lemon juice, lime juice, kumquat juice, tangerine juice, and combinations thereof. In yet further embodiments, the process includes determining that a brix-to-acid ratio of a citrus juice is less than about 16:1, and then mixing a miracle fruit component with the citrus juice having a brix-to-acid ratio of less than about 16:1 to produce a miracle fruit citrus juice composition. In further embodiments, the brix-to-acid ratio of the citrus juice is used to determine the amount of miracle fruit component to mix with the citrus juice.

Another aspect of the present disclosure is the provision of a kit that includes a citrus juice component and a miracle fruit component.

DETAILED DESCRIPTION OF THE INVENTION

Citrus juice having a brix-to-acid ratio of less than about 16:1 is typically perceived by the consumer as being bitter or sour. However, such juice poses no harm to humans. Similarly, juice obtained from citrus trees affected by disease, including citrus greening disease, does not pose a harm to humans, but humans typically find juice from disease impacted trees to be unacceptable due to its bitterness and sourness. Embodiments address the disease impacted trees issue by providing compositions and processes directed towards adding a miracle fruit component to the bitter and sour juice of fruit from infected trees so that consumer will perceive the citrus juice as sweet and palatable.

One aspect of the present disclosure is the provision of compositions including a citrus juice with a brix-to-acid ratio of less than about 16:1 and a miracle fruit component. Another aspect of the present disclosure is the provision of compositions including a citrus juice obtained from citrus fruits grown on a plant infected with disease, such as citrus greening disease, and a miracle fruit component. The composition may produce a juice that consumers find palatable even though the citrus juice was obtained from otherwise bitter and sour citrus fruits.

In certain embodiments, the citrus juice is selected from orange juice, grapefruit juice, lemon juice, lime juice, kumquat juice, tangerine juice, and combinations thereof. These are the citrus trees typically affected by citrus greening disease and also citrus fruits that are commonly used in the making of juices. Other fruits are contemplated.

According to embodiments described herein, the miracle fruit component contains miraculin, which is a protein that binds to a consumer's taste receptor. In particular embodiments, the miracle fruit component is obtained from miracle fruit pulp powder, fresh miracle fruit pulp, frozen miracle fruit pulp, and miracle fruit pulp concentrates. In still further embodiments, the miraculin may be obtained from synthetic sources. Various sources of miracle fruit are available. As described herein, the miracle fruit component may be any form that includes miraculin that is derived from pulp of miracle fruit. A person of ordinary skill in the art would understand that the concentrations of the miracle fruit component can vary depending on the addition, substitution, and/or subtraction of ingredients in a given composition, as well as the starting bitterness and sourness of the citrus juice. A person of skill in the art will also understand that the source of the miracle fruit component may be selected based on a desired preparation process or beverage. The source of the miracle fruit component may also be indicative of the process to be used for preparation of the compositions. For instance, if a process includes adding miracle fruit component directly to citrus juice, a very fine miraculin powder or synthetic source of miraculin may be selected and used such that the very fine miraculin power or synthetic source of miraculin may be dissolved directly into the citrus juice without causing discoloration or granularity/particulates. Similarly, if miracle fruit pulp concentrate is utilized, the concentrate may be diluted with water or other liquid. Additional processing of the diluted concentrated, such as by centrifuging, may then be used to remove particulate or granular matter, as such particulate or granular matter may not be desired by the consumer.

In some embodiments of the present disclosure, the miracle fruit component may be obtained from a miracle fruit pulp powder that is obtained by freeze-drying miracle fruit pulp. In further embodiments, the miracle fruit component may be obtained by dissolving the miracle fruit pulp powder in a liquid, such as water, fruit juice, or other selected beverage or liquid, to produce a liquid phase containing miraculin. The resulting liquid phase may then added to the citrus juice. In further embodiments, the resulting liquid phase may be directly added to the citrus juice. In some embodiments, particulates or solids may be removed using known processes, such as centrifuging, from the liquid phase before being added to the citrus juice. The resulting miracle fruit citrus beverage is then perceived by the consumer as lacking the bitterness and sourness typically associated with citrus fruit from diseased trees. The miracle fruit citrus beverage may also be perceived by the consumer as being sweeter without added calories of an additional sweetener, such as sugar, or other calorie-laden sweeteners. Additionally, in yet further embodiments, consumers do not experience a continued sweetened taste related to the miracle fruit component after consuming the composition that is typically experienced by an individual consuming miracle fruit tablets.

The citrus juice may be in a variety of forms, including fresh juice or concentrated. Concentrated forms typically utilize dilution so that the consumers find the resulting composition palatable. A person of skill in the art will understand that citrus juices used in the various embodiments of the present invention will typically display varying degrees of bitterness and sourness, based on citrus variety and extent of impact of the disease on the citrus plant. Because the citrus juices used in the various embodiments may display varying levels of bitterness and sourness, a ratio of miracle fruit component-to-citrus juice may have a wide range. A person of ordinary skill in the art will understand how to adjust the concentration of miracle fruit component in the citrus juice to yield a beverage that is perceived as sweet and palatable to a typical consumer.

In particular, a perceived taste of the juice is typically related to the brix-to-acid ratio of the juice. Typical orange juices on the market have a brix-to-acid ratio of about 17:1-19:1. Juices perceived by the consumer as being bitter and sour typically have a much lower brix-to-acid ratio. For instance, a juice with a brix-to-acid ratio of less than about 16:1 will likely not be perceived as being sweet or acceptable to the typical consumer. Juices from fruit grown on trees affected by citrus greening disease typically have a brix-to-acid ratio of about 10:1 to about 15:1. Therefore, certain embodiments of processes described herein may further include determining the brix-to-acid ratio of the citrus juice to then determine an amount of miracle fruit component to add to the citrus juice to achieve a final product to be deemed acceptable to a consumer.

In some embodiments, when using powdered miracle fruit, the desired final concentration of miracle fruit pulp powder may range from about 0.005% to 2% by weight of the final product. In further embodiments, the desired final concentration of miracle fruit pulp powder may range from about 0.005% to 0.01% of the final product. In further embodiments, the desired final concentration of miracle fruit pulp powder may range from about 0.01% to 0.2% of the final product. In further embodiments, the desired final concentration of miracle fruit pulp powder may range from about 0.5% to 1.0% of the final product. In further embodiments, the desired final concentration of miracle fruit pulp powder may range from about 1.0% to 1.5% of the final product. In further embodiments, the desired final concentration of miracle fruit pulp powder may range from about 1.5% to 2.0% of the final product. In some embodiments, the concentration of miracle fruit pulp powder may be about 0.005% of the final product. In some embodiments, the concentration of miracle fruit pulp powder may be about 0.01% of the final product. In some embodiments, the concentration of miracle fruit pulp powder may be about 0.02% of the final product. In some embodiments, the concentration of miracle fruit pulp powder may be about 0.03% of the final product. In some embodiments, the concentration of miracle fruit pulp powder may be about 0.04% of the final product. In some embodiments, the concentration of miracle fruit pulp powder may be about 0.05% of the final product. In some embodiments, the concentration of miracle fruit pulp powder may be about 0.06% of the final product. In some embodiments, the concentration of miracle fruit pulp powder may be about 0.07% of the final product. In some embodiments, the concentration of miracle fruit pulp powder may be about 0.08% of the final product. In some embodiments, the concentration of miracle fruit pulp powder may be about 0.09% of the final product. In some embodiments, the concentration of miracle fruit pulp powder may be about 0.1% of the final product. In some embodiments, the concentration of miracle fruit pulp powder may be about 0.2% of the final product. In some embodiments, the concentration of miracle fruit pulp powder may be about 0.3% of the final product. In some embodiments, the concentration of miracle fruit pulp powder may be about 0.4% of the final product. In some embodiments, the concentration of miracle fruit pulp powder may be about 0.5% of the final product. In some embodiments, the concentration of miracle fruit pulp powder may be about 0.6% of the final product. In some embodiments, the concentration of miracle fruit pulp powder may be about 0.7% of the final product. In some embodiments, the concentration of miracle fruit pulp powder may be about 0.8% of the final product. In some embodiments, the concentration of miracle fruit pulp powder may be about 0.9% of the final product. In some embodiments, the concentration of miracle fruit pulp powder may be about 1.0% of the final product. In some embodiments, the concentration of miracle fruit pulp powder may be about 1.1% of the final product. In some embodiments, the concentration of miracle fruit pulp powder may be about 1.2% of the final product. In some embodiments, the concentration of miracle fruit pulp powder may be about 1.3% of the final product. In some embodiments, the concentration of miracle fruit pulp powder may be about 1.4% of the final product. In some embodiments, the concentration of miracle fruit pulp powder may be about 1.5% of the final product. In some embodiments, the concentration of miracle fruit pulp powder may be about 1.6% of the final product. In some embodiments, the concentration of miracle fruit pulp powder may be about 1.7% of the final product. In some embodiments, the concentration of miracle fruit pulp powder may be about 1.8% of the final product. In some embodiments, the concentration of miracle fruit pulp powder may be about 1.9% of the final product. In some embodiments, the concentration of miracle fruit pulp powder may be about 2.0% of the final product. Although the percentages provided above are expressed in "by weight" values, one of ordinary skill in the art would understand that the percentages may be determined and expressed in "by volume" values.

In some embodiments, when using fresh or frozen miracle fruit pulp, the desired final concentration of the fresh or frozen miracle fruit pulp may range from about 0.025% to 5% of the final product. In further embodiments, the desired final concentration of miracle fruit pulp powder may range from about 0.05% to 1% of the final product. In further embodiments, the desired final concentration of miracle fruit pulp powder may range from about 0.025% to 0.05% of the final product. In further embodiments, the desired final concentration of miracle fruit pulp powder may range from about 1.0% to 2.0% of the final product. In further embodiments, the desired final concentration of miracle fruit pulp powder may range from about 2.0% to 3.0% of the final product. In further embodiments, the desired final concentration of miracle fruit pulp powder may range from about 3.0% to 4.0% of the final product. In further embodiments, the desired final concentration of miracle fruit pulp powder may range from about 4.0% to 5.0% of the final product. In some embodiments, the concentration of fresh or frozen miracle fruit pulp may be about 0.025% of the final product. In some embodiments, the concentration of fresh or frozen miracle fruit pulp may be about 0.05% of the final product. In some embodiments, the concentration of fresh or frozen miracle fruit pulp may be about 0.075% of the final product. In some embodiments, the concentration of fresh or frozen miracle fruit pulp may be about 0.1% of the final product. In some embodiments, the concentration of fresh or frozen miracle fruit pulp may be about 0.2% of the final product. In some embodiments, the concentration of fresh or frozen miracle fruit pulp may be about 0.3% of the final product. In some embodiments, the concentration of fresh or frozen miracle fruit pulp may be about 0.4% of the final product. In some embodiments, the concentration of fresh or frozen miracle fruit pulp may be about 0.5% of the final product. In some embodiments, the concentration of fresh or frozen miracle fruit pulp may be about 0.6% of the final product. In some embodiments, the concentration of fresh or frozen miracle fruit pulp may be about 0.7% of the final product. In some embodiments, the concentration of fresh or frozen miracle fruit pulp may be about 0.8% of the final product. In some embodiments, the concentration of fresh or frozen miracle fruit pulp may be about 0.9% of the final product. In some embodiments, the concentration of fresh or frozen miracle fruit pulp may be about 1% of the final product. In some embodiments, the concentration of fresh or frozen miracle fruit pulp may be about 1.5% of the final product. In some embodiments, the concentration of fresh or frozen miracle fruit pulp may be about 2.0% of the final product. In some embodiments, the concentration of fresh or frozen miracle fruit pulp may be about 2.5% of the final product. In some embodiments, the concentration of fresh or frozen miracle fruit pulp may be about 3.0% of the final product. In some embodiments, the concentration of fresh or frozen miracle fruit pulp may be about 3.5% of the final product. In some embodiments, the concentration of fresh or frozen miracle fruit pulp may be about 4.0% of the final product. In some embodiments, the concentration of fresh or frozen miracle fruit pulp may be about 4.5% of the final product. In some embodiments, the concentration of fresh or frozen miracle fruit pulp may be about 5.0% of the final product.

A person of ordinary skill in the art would understand that the concentrations of the miracle fruit component can vary depending on the addition, substitution, and/or subtraction of ingredients in a given composition, as well as the perceived bitterness and sourness of the starting citrus juice.

It is noted that the brix-to-acid ratio does not increase when including a miracle fruit component, but rather a consumer's perception of the sweetness changes as a result of the miraculin receptors binding to a consumer's taste receptors.

A method of making a citrus juice comprising mixing a citrus juice having a brix-to-acid ratio of less than about 16:1 with a miracle fruit component to produce a miracle fruit citrus juice composition. In further embodiments, the process includes making a citrus juice from citrus fruit obtained from trees infected with disease, such as citrus greening disease. The process may include mixing a citrus juice from citrus fruits grown on trees infected with disease with a miracle fruit component from miracle fruit pulp to produce a miracle fruit citrus juice composition.

In further embodiments, the process may include use of citrus juice that is concentrated citrus juice. In some embodiments, the process may further include diluting the concentrated citrus juice with water before mixing the citrus juice with the miracle fruit component. In other embodiments, the process further includes diluting the miracle fruit citrus juice composition after the mixing step. In certain embodiments, the process may further include dissolving the miracle fruit component in water, juice, or other liquid before the mixing step. Additional processing of the dissolved miracle fruit component, such as by centrifuging, may be utilized to remove particulate or granular matter that consumers may not find desirable.

Adding miracle fruit component to the juice eliminates an alternative, less desirable approach of consumers chewing a miracle fruit tablet first. The juice-miracle fruit component mix allows consumers to enjoy the full taste of citrus juice without the bitterness or sourness typically associated with fruits from trees affected by disease. Moreover, the mixed juice with miracle fruit composite beverage allows citrus growers to utilize fruit that otherwise may not have been deemed acceptable for human consumption. Given the importance of the citrus juice industry, and the rise in frequency of diseases in citrus crops, such as citrus greening disease, the compositions and processes described herein solve significant issues for the fruit juice industry.

Some embodiments provide a diseased affected citrus juice and miracle fruit component composition that is perceived as sweet and palatable to consumers. The juice may also be perceived by the consumer as being sweeter without the added calories of a sweetener, such as sugar or other calorie-laden sweeteners.

In yet further embodiments, the process includes determining that a brix-to-acid ratio of a citrus juice is less than about 16:1 and then mixing a miracle fruit component with the citrus juice having a brix-to-acid ratio of less than about 16:1 to produce a miracle fruit citrus juice composition. In further embodiments, the brix-to-acid ratio of the citrus juice is used to determine the amount of miracle fruit component to mix with the citrus juice. In such embodiments, the citrus juice may be obtained from any source yielding citrus juice with a brix-to-acid ratio of less than about 16:1. Such embodiments allow for citrus juice that would otherwise be deemed unpalatable to the typical consumer to be perceived by the consumer as being sweet and palatable. Such juices may be from premature fruits or from fruits that dropped early, early season fruits, fruits produced from tress grown in less than favorable environmental or climate circumstances, or trees infected with disease or parasites. It should be understood that the principles described herein may be applied to fruit that is not affected by a disease, but may naturally have a less than about 16:1 brix-to-acid ratio.

Another aspect of the present disclosure is the provision of a kit that includes a citrus juice component and a miracle fruit component. The kit may include the citrus component and miracle fruit component in the same package, but separate compartments, such that the citrus component and miracle fruit component are combined before consumption by the consumer. The kit may also include two separately packaged components that are combined before consumption by the consumer.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

The steps of the methods described herein may be conducted in any particular order, unless otherwise indicated or necessary to accomplish the described methods.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Composition Preparation

An orange juice concentrate (66 Brix) from oranges from trees with citrus greening disease were used to make a single strength orange juice (12 Brix).

Miracle fruit pulp powder from fresh crop was ordered from Miracle Fruit Farm located in Miami, Fla. To prepare the miracle fruit component containing miraculin, a 10% solution of the freeze-dried powder was made using filtered water at ambient temperature. The solution was agitated for 1 hour. After 1 hour, the solution was thick, but pourable. The solution was then centrifuged using a Beckman Coulter Allegra 25R centrifuge, at 3600 RPM for 5 minutes with temperature control at ambient temperature. The resulting supernatant containing miraculin was then collected.

Orange juice beverages were then prepared using the supernatant containing miraculin and the single strength orange juice. The following Table 1 shows the ingredients and their amount in the orange juice beverage without the miracle fruit component (Control Sample) and with miracle fruit component (Test Samples).

TABLE 1

| | Orange Juice Ingredients | | | |
|---|---|---|---|---|
| Ingredients | Control Sample Amount (% w/v) | Test Sample 1 Amount (% w/v) | Test Sample 2 Amount (% w/v) | Test Sample 3 Amount (% w/v) |
| Filtered water | 85.7 | 84.95 | 84.85 | 84.75 |
| Orange juice concentrate | 19.3 | 19.3 | 19.3 | 19.3 |
| Miracle fruit extract | — | 0.75 | 0.85 | 0.95 |
| TOTAL | 105 | 105 | 105 | 105 |

The miracle fruit concentration was 750 ppm (Test Sample 1), 850 ppm (Test Sample 2) and 950 ppm (Test Sample 3).

The miracle fruit supernatant was added to the single strength orange juice and stirred for 30 minutes. The resulting orange juice beverage was then filled in 400 ml-PET bottles. The resulting orange juice beverage was pasteurized (in-bottle pasteurization using Miele Professional® washer (Miele, Princeton, N.J.) with temperature and time control at 80° C. for 15 minutes. The resulting orange juice beverage was then cooled before being stored refrigerated.

The resulting orange juice beverages were aged at 35° C. for 3 days before taste evaluation at 4° C.

Example 2: Sensory Evaluation by Expert Panel

The beverages including fruit juice and a miracle fruit component were evaluated blindly by an expert panel of six people. Samples were coded and randomly presented to the panelists in 100 ml-opaque cups. Panelists were instructed to eat an unsalted cracker and rinse the mouth with mineral water before and in between samples. For each sample, panelists were instructed to take three sips, then write down their evaluation comments. The control sample was tasted first, followed by the test samples. Table 2 below summarizes the findings of the expert taste panel.

TABLE 2

Orange Juice with Miracle fruit pulp powder

| Orange Juice Samples | Concentration of Miracle fruit in Beverage | Panelists Comments |
|---|---|---|
| Control Sample | — | Too bitter and too sour |
| Test Sample 1 | 750 ppm | Sourness is reduced, sweeter than control |
| Test Sample 2 | 850 ppm | Not bitter or sour; sweeter than control, nice orange flavor profile, nice finish. Most preferred by panelists |
| Test Sample 3 | 950 ppm | Not bitter or sour, slight overall flavor change |

Panelists picked the Test Sample 2 as the best in terms of overall sweetness and flavor profile, with more balanced orange flavor. All panelists disliked the Control Sample and described it as too bitter, too sour, and very difficult to drink. Additionally, no panelists reported lingering perceived sweetness that is typically associated with consuming miracle fruit tablets. Notably, the expert panel preferred the middle concentration of miracle fruit, thus showing an optimization of concentration of miracle fruit can be achieved such that consumers experience the benefits of perceived sweetness of the miracle fruit at a consumer acceptable concentration. Additionally, the panel comments demonstrate that compositions can be prepared for consumption that do not have the lingering perceived sweetness as is typical of miracle fruit tablets.

As various modifications could be made in the compositions and methods herein described without departing from the scope of the invention, it is intended that all matter contained in the foregoing description shall be interpreted as illustrative rather than limiting. The breadth and scope of the present invention should not be limited by any of the above-described exemplary embodiments, but should be defined only in accordance with the following claims appended hereto and their equivalents. All patent and non-patent documents cited in this specification are incorporated herein by reference in their entireties.

The invention claimed is:

1. A beverage comprising:
   citrus juice obtained from fruit impacted by citrus greening disease and a brix-to-acid ratio from 10:1 to 15:1 and an added miracle fruit component, wherein the added miracle fruit component is present in an amount from about 750 ppm to about 950 ppm, and the citrus juice is orange juice and the beverage does not exhibit lingering perceived sweetness as a result of the miracle fruit component.

2. The beverage of claim 1, wherein the miracle fruit component is miracle fruit pulp powder.

3. The beverage of claim 2, wherein the miracle fruit pulp powder is about 0.005% to 2% of the composition.

4. The beverage of claim 2, wherein the miracle fruit pulp powder is about 0.01% to 0.2% of the composition.

5. The beverage of claim 1, wherein the miracle fruit component is fresh miracle fruit pulp.

6. The beverage of claim 5, wherein the fresh miracle fruit pulp is about 0.025% to 5% of the composition.

7. The beverage of claim 5, wherein the fresh miracle fruit pulp is about 0.05% to 1% of the composition.

8. The beverage of claim 1, wherein the miracle fruit component is frozen miracle fruit pulp.

9. The beverage of claim 8, wherein the frozen miracle fruit pulp is about 0.025% to 5% of the composition.

10. The beverage of claim 8, wherein the frozen miracle fruit pulp is about 0.05% to 1% of the composition.

11. The beverage of claim 1, wherein the orange juice is in concentrated form.

12. The beverage of claim 1, wherein the orange juice is fresh orange juice.

13. The beverage of claim 1, wherein the beverage is bottled.

14. A method of making a citrus juice comprising mixing a citrus juice from fruit impacted by citrus greening disease with a miracle fruit component to produce a miracle fruit citrus juice composition, wherein the citrus juice has a brix-to-acid ratio from 10:1 to 15:1, the citrus juice is orange juice, and the miracle fruit component is present in the citrus juice in an amount from about 750 ppm to about 950 ppm, wherein the juice does not exhibit lingering perceived sweetness as a result of the miracle fruit component.

15. The method of claim 14, wherein mixing a citrus juice from fruit impacted by citrus greening disease includes mixing a concentrated citrus juice from fruit impacted by citrus greening disease, and further comprising diluting the concentrated citrus juice from fruit impacted by citrus greening disease with water before the mixing with the miracle fruit component.

16. The method of claim 14, wherein mixing a citrus juice from fruit impacted by citrus greening disease includes mixing a concentrated citrus juice from fruit impacted by citrus greening disease, and further comprising diluting the miracle fruit citrus juice composition after mixing with the concentrated citrus juice from fruit impacted by citrus greening disease.

17. The method of claim 14, wherein mixing a miracle fruit component includes mixing powdered miracle fruit component, and further comprising dissolving the miracle fruit component in water before mixing with the citrus juice from fruit impacted by citrus greening disease.

18. The method of claim 14, wherein mixing a miracle fruit component includes mixing a powdered miracle fruit component.

19. The method of claim 14, wherein mixing a miracle fruit component includes mixing a miracle fruit component obtained from fresh miracle fruit.

20. The method of claim 14, further comprising:
using the brix-to-acid ratio of the citrus juice from fruit impacted by citrus greening disease to determine the amount of miracle fruit component to mix with the citrus juice.

21. The method of claim 14, further comprising bottling the citrus juice.

22. A method of making a citrus juice from citrus fruit obtained from trees infected with citrus greening disease comprising:
providing a concentrated citrus juice from citrus fruits grown on trees infected with citrus greening disease, wherein the citrus juice is orange juice and the concentrated citrus juice has a brix-to-acid ratio from 10:1 to 15:1;
diluting the concentrated citrus juice with water to produce a diluted citrus juice;
providing a powdered miracle fruit component;
reconstituting the powdered miracle fruit component with water to produce a liquid miracle fruit component; and
mixing the liquid miracle fruit component with the diluted citrus juice to produce a miracle fruit citrus juice composition, wherein the miracle fruit component is present in the miracle fruit citrus juice composition in an amount from 750 ppm to 950 ppm and the citrus juice does not exhibit a lingering perceived sweetness as a result of the miracle fruit component.

23. The method of claim 22, further comprising bottling the miracle fruit citrus juice composition.

* * * * *